United States Patent [19]

Price

[11] Patent Number: 5,673,613
[45] Date of Patent: Oct. 7, 1997

[54] SMOKELESS ELECTRIC COOKER

[76] Inventor: Gary W. Price, 3540 Sommerville Rd., Boaz, Ala. 35957

[21] Appl. No.: 516,602

[22] Filed: Aug. 18, 1995

[51] Int. Cl.[6] .............................. A23L 1/00; A21C 13/00; A23B 1/04; A47J 37/04
[52] U.S. Cl. .............................. 99/482; 99/330; 99/339; 99/340; 99/357; 99/400; 99/446; 126/20; 126/25 R; 126/369; 219/401
[58] Field of Search .............................. 99/330, 339, 467, 99/340, 468, 357, 470–476, 483, 400, 516, 446, 534, 444, 536, 482, 481; 126/20, 20.2, 369; 219/400, 401; 426/418, 510, 511, 523

[56] References Cited

U.S. PATENT DOCUMENTS 4,655,192  4/1987  Jovanovic .............................. 99/467 X

*Primary Examiner*—Timothy F. Simone
*Attorney, Agent, or Firm*—John C. Garvin, Jr.; Harold W. Hilton

[57] ABSTRACT

A substantially smokeless cooker is disclosed. The cooker includes a housing having a cooking chamber therein. A first heating element including at least one resistive element is carried in the cooking chamber to supply heat directly to food positioned adjacent thereto for cooking thereof. A steam producing apparatus independent of the first heating element is provided for producing steam. The vapors in the steam are disposed for permeating the food to provide moisture thereto during the cooking thereof.

18 Claims, 6 Drawing Sheets

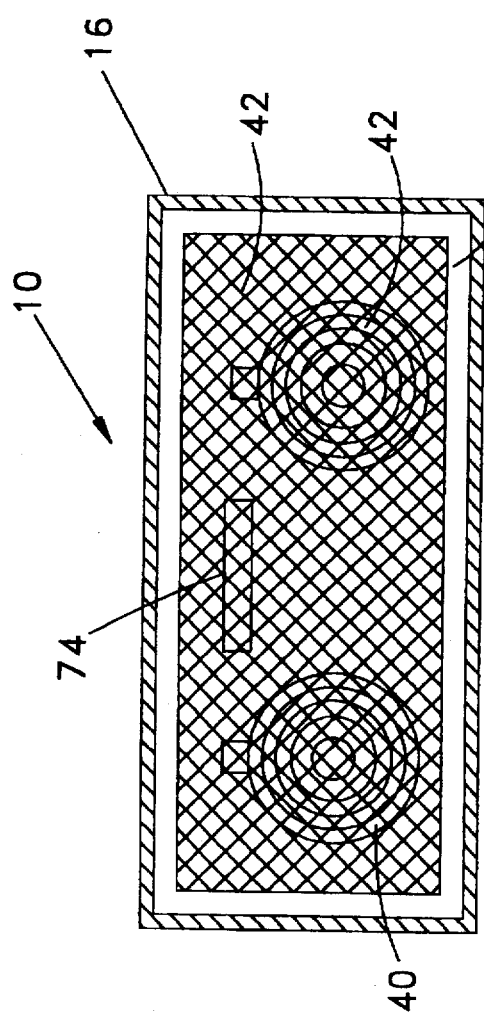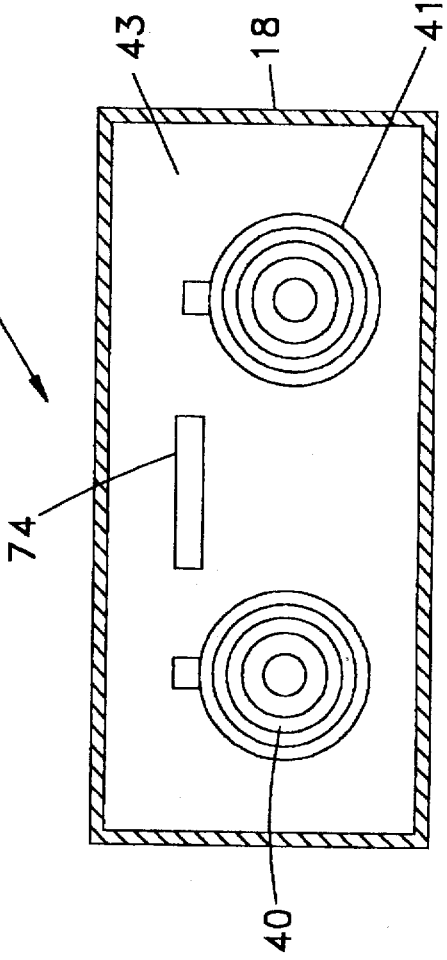

SMOKELESS ELECTRIC COOKER

FIELD OF THE INVENTION

The present invention relates to a cooking device and more particularly to an electrically heated smokeless cooker for cooking meats and other foods.

BACKGROUND OF THE INVENTION

"Barbecue" grills are well known in the art. Typically, such grills include a housing enclosing a food supporting rack which is positional above a bed of charcoal. A water container is typically placed between the charcoal bed and the food to provide moisture to the food while it is being cooked. Wood chips are generally added onto the hot coals to impart flavor to the cooking material. Such devices create an excessive amount of smoke.

Electric grills are available which include an electrical resistive element (burner) which is used to directly heat a heat retentative container which contains wood chips which is placed beneath the food to be cooked. Heat from the heated charcoal and wood chips serve to cook the food. A pan of water is generally placed between the wood chips and the food. Such electric cookers are disclosed in U.S. Pat. Nos. 3,776,127 and 4,554,864 issued Dec. 4, 1973 and Nov. 26, 1985.

The cooker of the present invention provides for heat to be supplied directly to the cooking material from at least one resistive element or burner which is positioned beneath and juxtaposed a grid which supports the material to be cooked. Heat is directly applied to the food by the burner to cook the food. A separate resistive element or burner is provided to heat a container with a mixture of water and a food flavoring such as wood chips therein to produce steam vapors having the flavor of the wood chips. By this arrangement, while the material is being directly cooked by the upper burner or burners, steam generated in the container is directed upwardly therefrom to be circulated around the cooking material to permeate the food and impart moisture and any desired flavor thereto. Although wood chips are disclosed as supplying the food flavoring, it is to be understood that the liquid flavoring may be utilized, as well.

It is, therefore, an object of the present invention to provide a substantially smokeless electric cooker.

It is a further object of the present invention to provide such a cooker with means for imparting steam vapors into the material being cooked, the droplets in the vapor possessing a selected flavor.

It is a further object of the present invention to provide such a smokeless grill in which any smoke produced is a result of the cooking material and not as a result of external sources such as burning charcoal or burning wood chips.

It is yet another object of the present invention to provide such a cooker with separate burners to respectively, cook the food and to heat a mixture of food flavoring and water to boil the water and thus produce steam vapors which permeate the food to impart a desired flavor thereto.

BRIEF DESCRIPTION OF THE DRAWINGS

FIG. 4 is a pictorial view of the water and wood chip container as seen in FIGS. 2 and 3.

FIG. 7 is a sectional view taken along line 7—7 of FIG. 6.

FIG. 8 is a sectional view taken along line 8—8 of FIG. 6.

DESCRIPTION OF THE PREFERRED EMBODIMENT

Figure 1:
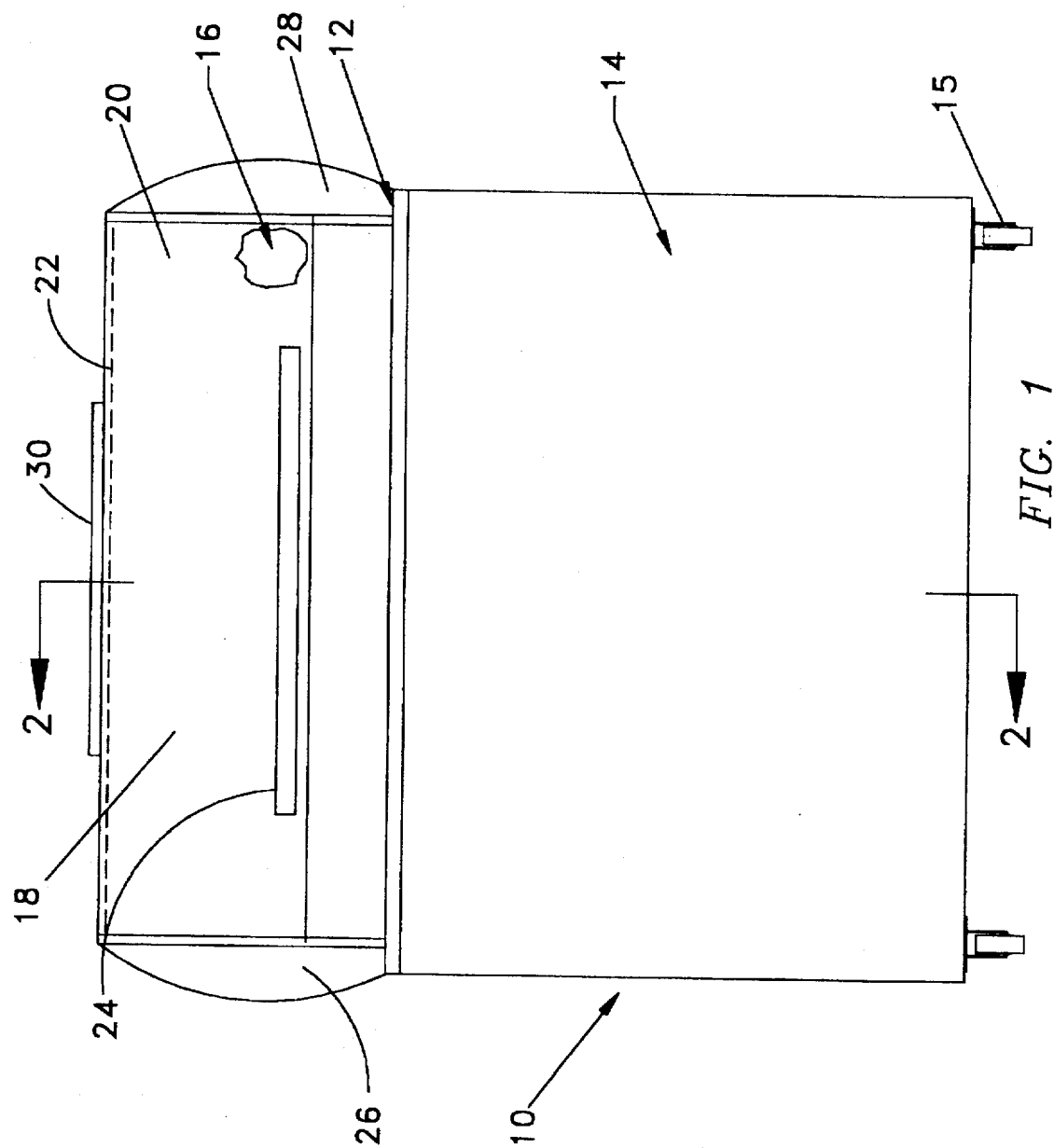
FIG. 1 is a front elevational view of the smokeless grill of the present invention.

As seen in FIG. 1, a smokeless cooker 10 is shown to include a housing 12 which encloses a cooking chamber 16. Cooker 10 further includes a lower frame portion 14. Cooking chamber 16 is formed by a cylindrical member 18 having a door 20 secured thereto by hinge 22 (more clearly shown in FIG. 2). A handle 24 is provided to open and close door 20. Each end of cylindrical member 18 is respectively provided with end closure members 26 and 28. A door stop 30 is shown on the upper surface of cylindrical member 18, to limit the door movement when the door is pivoted upwardly about hinge 22 (more clearly shown in FIG. 2).

Figure 2:
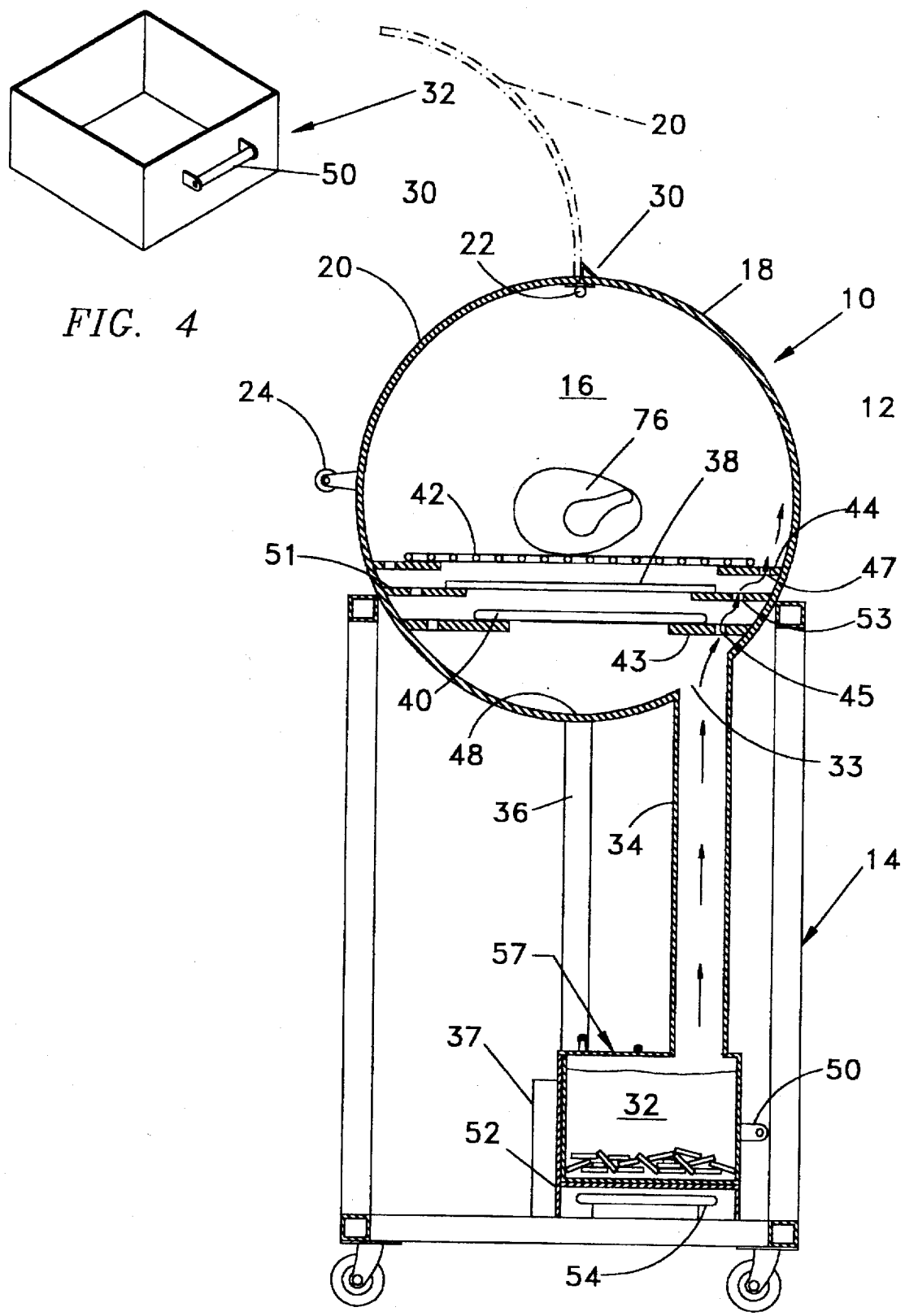
FIG. 2 is a sectional view taken along line 2—2 of FIG. 1.

FIG. 2 is a cross-sectional view taken along line 2—2 of FIG. 1 and illustrates the interior of the cooker 10. As seen in FIG. 2, lower frame portion 14 of the cooker encloses a steam box 32, and a steam duct 34 which connects steam box 32 with an opening 33 in cooking chamber 16. The duct communicates with cooking chamber 16 through a passage 48. A grease drain tube 36 extends downwardly from the lower portion of chamber 16 to a grease collector 37.

Cylindrical member 18 is shown to enclose a pair of upper burners 40 and 41 (only one is shown in FIG. 2) which are supported on a pair of longitudinally extending brackets 43 having steam passages 45 therein. The steam passages 45 extend along the length of brackets 43. A grid rack 42 is mounted above the burners and is supported by a pair of longitudinally extending brackets 44 having steam passages 47 therein. The steam passages 47 extend along the length of brackets 44. Mounted between the burners and the rack 42 is a grease plate collector 38 which is supported on a pair of longitudinally extending brackets 51 having steam passages 53 therein. The steam passages 53 extend along the length of brackets 51. Grease plate collector 38 may be provided with an upper surface which is angled downwardly to assist the grease in flowing downwardly toward an opening 48 in grease drain 36 and also is removably mounted on brackets 51 to permit removal and cleaning thereof.

Figure 3:
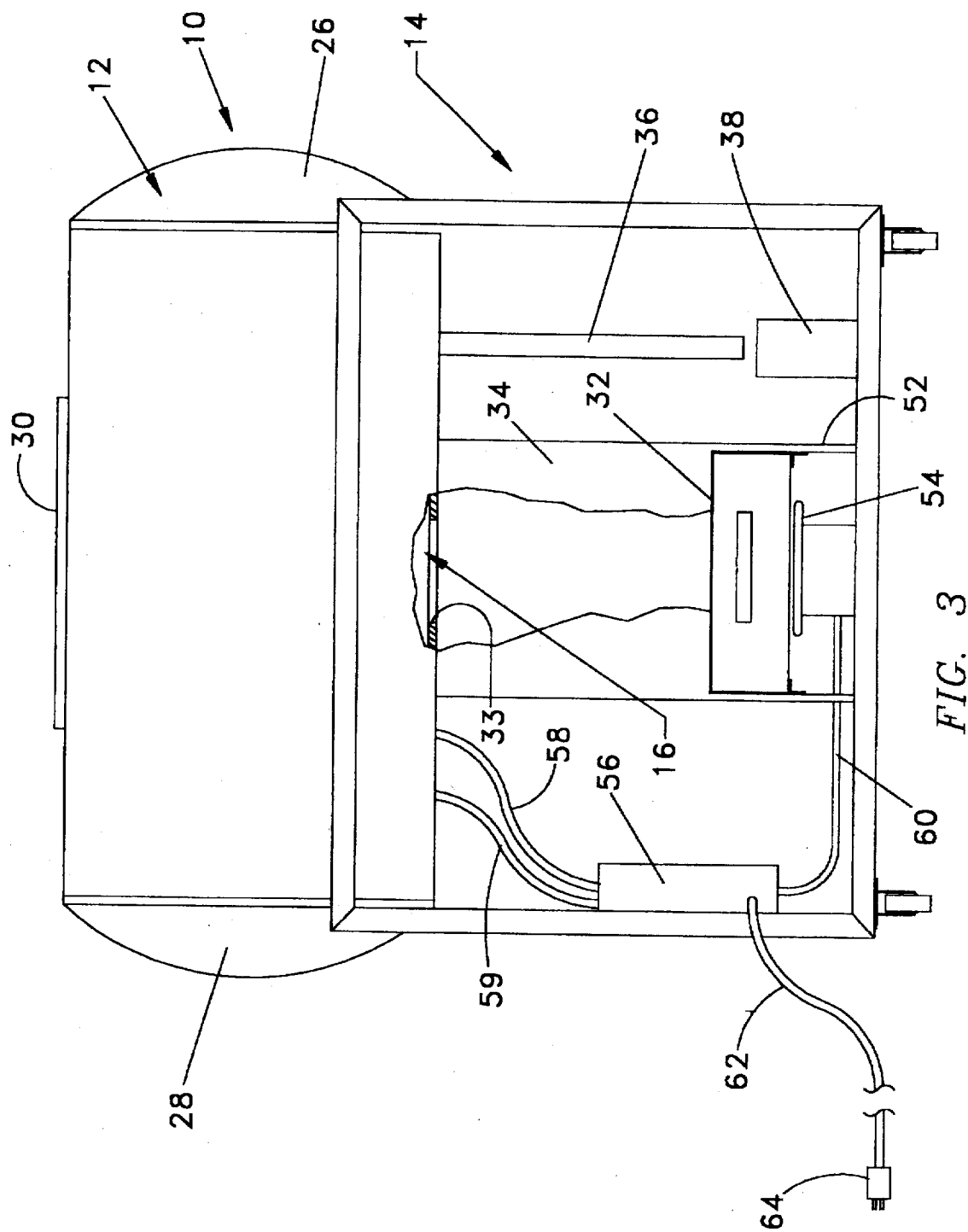
FIG. 3 is a rear elevational view, partially in section, of the grill of FIGS. 1 and 2.

As seen in FIGS. 2, 3 and 4, steam box 32 is a rectangular box which is open at the top and is provided to contain water to which a flavoring may be added, if desired. Steam box 32 is provided with a handle 50 for moving box 32 into and out of a support assembly 52 which supports the box 32 and also encloses a lower burner 54. Steam box support assembly 52 is provided to support the steam box. The top of the assembly may, if desired, have a top pivotably mounted door 57 which may be opened to add food flavoring or water. An electrical junction box 56 (FIG. 3) is provided inside of the lower portion of the housing to enclose the typical electrical connections between conductors 58, 59, 60 and 62 which respectively lead to the upper burners 40 and 41 and lower burner 54 and to an electrical plug 64.

FIG. 5–8 illustrates another embodiment of the present invention wherein like reference numerals refer to like parts.

Figure 5:
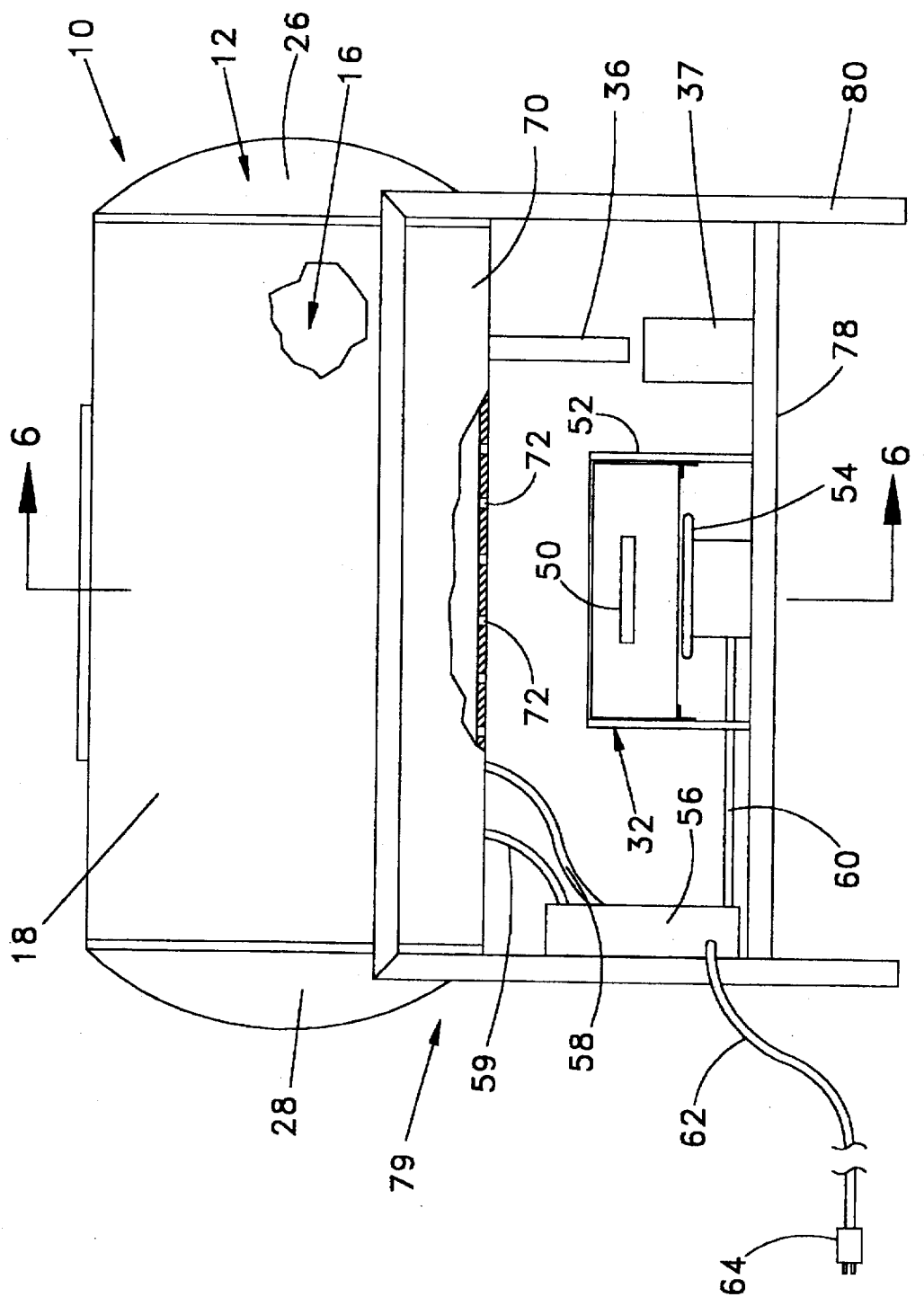
FIG. 5 is a rear elevational view, partially in section of another embodiment of the present invention.
Figure 6:
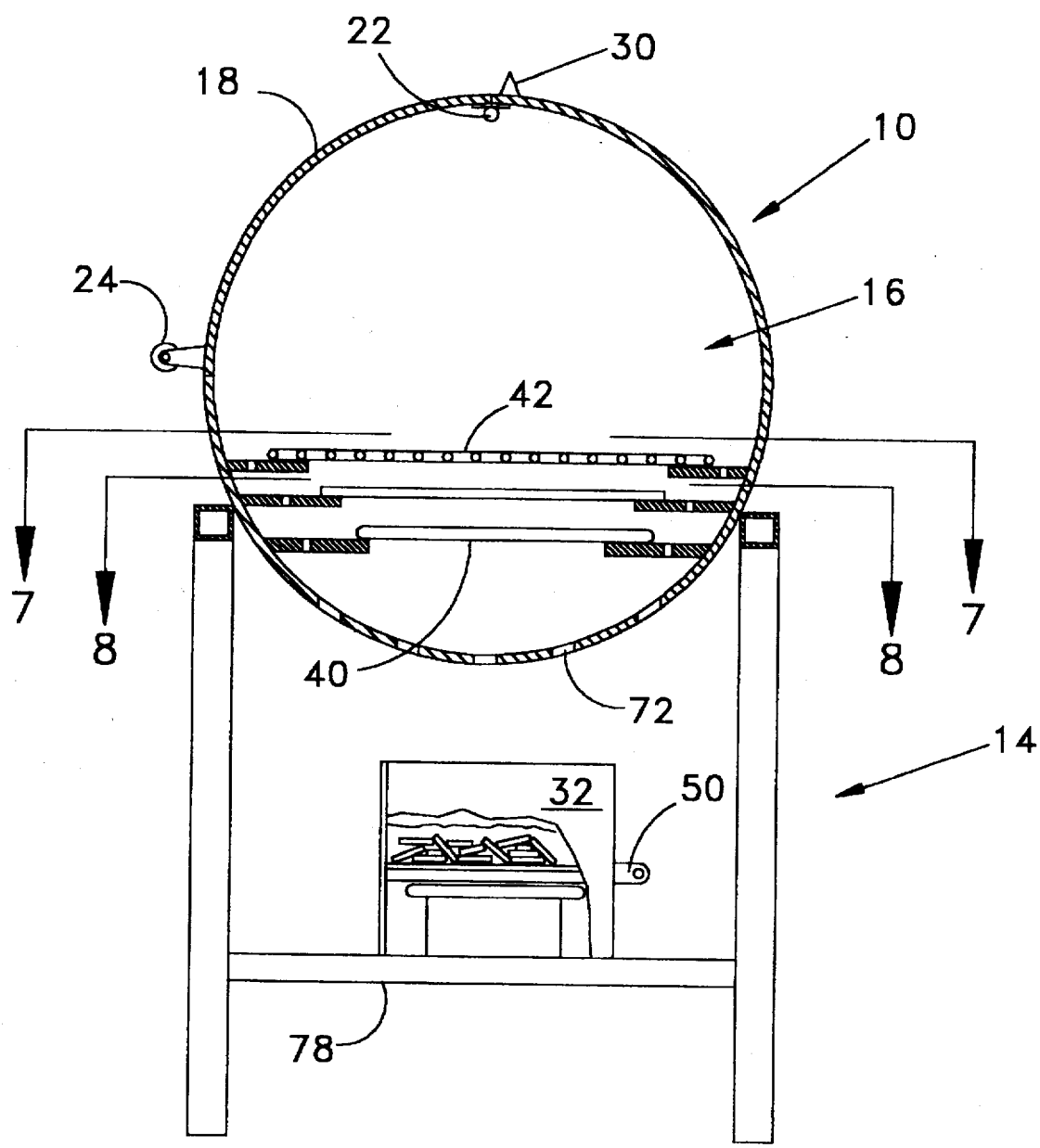
FIG. 6 is a sectional view taken along lines 6—6 of FIG. 5.

The primary difference between the embodiment of FIGS. 5–8 and that of FIGS. 1–3 is that no duct 32 is used. As seen in FIG. 5, lower section 70 of cylindrical member 18 is provided with a plurality of openings 72 through which steam passes into chamber 16 from steam chest 32. In this embodiment, both box 32 and support member 52 are open at the top. Once inside cooking chamber, 16, steam is then directed through passages 45, 53 and 47 and around the material 76 being cooked. As shown in FIGS. 5 and 6 steam chest 32 and grease collector 37 is supported on a base plate 78 and housing 16 is mounted on a frame 79 which is provided with legs 80, although, if desired, wheels 15 as illustrated in FIGS. 1–3 may be utilized. While the member 18 is described as having a plurality of openings in the lower section thereof, it is to be understood that a single larger opening may be resorted to, if desired. It is also to be understood that a duct may be used in this embodiment, if desired.

FIG. 7 is a sectional view taken along line 7—7 of FIG. 6 and illustrates the two burners 40 and 41 and the grid 42 positioned over the burners. FIG. 7 also illustrates an additional steam passage 74 provided in the burner support plate which may be utilized, if desired.

FIG. 8 is a view similar to FIG. 7 with the grid 42 removed.

It is to be understood that each of the upper burners 40 and 41 may be a 220 volt, 2100 watt stove eye burner which is energized by typical 110 volt household current. By electrifying the 220 volt burners by a 110 volt supply the burners are prevented from becoming too hot and burning the food. Also, by this arrangement, the food does not have to be turned as is typically done.

It is to be understood that although two 220 volt burners are described as being used in the cooker of the present invention, more or less burners may be utilized, as desired. Also, while the burners are described as typical eye burners, elongated calrod units as used in ovens may be used, if desired.

In operation, water is first placed into the steam box and the food is placed on the grid rack. The burners 40 and 41 and the lower steam box burner 54, are energized. Cooking is accomplished by the upper burners and the lower burner is used to boil the water in box 32. When the water reaches a boiling point, steam vapors possessing the flavor created by the food flavoring (if food flavoring has been used) moves into the cooking chamber and circulates around the food. The moisture in steam carries any smoke into the food and retains any smoke in the cooking chamber. The moisture also penetrates the food to keep the food moist as it cooks.

I claim:

1. A substantially smokeless cooker comprising:
   a housing having a cooking chamber therein;
   first heating means including at least one resistive element carried in said cooking chamber, said first heating means disposed of supplying heat directly to food for cooking thereof;
   steam producing means independent of said first heating means for producing steam, the vapors in said steam disposed for permeating said food to provide moisture thereto during the cooking thereof;
   said steam producing means being defined by a second heating means and a water container carried adjacent said second heating means, said second heating means adapted for heating said water to produce steam;
   a first food support member carried in spaced, juxtaposed relation with said first heating means for supporting said food above and adjacent said first heating means; and
   grease collector means mounted intermediate said first heating means and said food support member, said grease collector means adapted for preventing grease emanating from said food from coming in contact with said first heating means.

2. A smokeless cooker as in claim 1 wherein said second heating means is disposed externally of said cooking chamber.

3. A smokeless cooker as in claim 2 including steam passage means for directing steam into said cooking chamber.

4. A smokeless cooker as in claim 3 wherein said steam passage means is a duct connecting said steam producing means with said cooking chamber.

5. A smokeless cooker as in claim 3 wherein said cooking chamber is enclosed by an enclosure having a plurality openings therein facing said steam producing means, said plurality of openings defining said steam passage means.

6. A smokeless cooker as in claim 1 wherein said steam is provided with food flavoring for permeating said food.

7. A smokeless cooker as in claim 1 including a second support member disposed for removably supporting said grease collector means in said cooking chamber, said second support member having steam passage means therein.

8. A smokeless cooker as in claim 5 including a third support means for supporting said first heating element in said cooking chamber, said third support means having steam passages therein.

9. A smokeless cooker as in claim 1 wherein said second heating means is a resistive element.

10. A substantially smokeless cooker comprising:
    a housing having a cooking chamber therein;
    first heating means including at least one resistance heating element carried in said housing;
    a food support member carried in spaced juxtaposed relation with said first heating means for supporting food to be cooked adjacent to and above said first heating means;
    grease collector means mounted intermediate said first heating means and said food support member, said grease collector means disposed to prevent grease emanating from said food from becoming in contact with said first heating means;
    a container for containing water mounted externally of said enclosed housing;
    second heating means including at least one resistance heating element disposed adjacent said container for heating said water for boiling thereof to produce steam vapors for permeating said food; and
    passage means for directing said steam vapors into said housing for circulation around said food.

11. A smokeless cooker as in claim 10 including food flavoring means carried in said water in said container to be carried into said food by steam vapors created in response to the boiling of said water.

12. A smokeless cooker as in claim 10 wherein said at least one resistive element is a 220 volt approximately 1800 watt element, operated by a 110 volt input.

13. A substantially smokeless cooker comprising:
    a housing having a cooking chamber therein;
    first heating means for supplying heat directly to food for cooking thereof, said first heating means including at least one resistive cooking element carried in said cooking chamber;
    steam producing means independent of said first heating means for producing steam, the vapors in said steam disposed for permeating said food to provide moisture thereto during the cooking thereof by said at least one resistive cooking element; and grease collector means mounted above said first heating means for preventing grease emanating from said food from coming in contact with said first heating means.

14. A smokeless cooker as in claim 13 wherein said steam producing means is defined by a second heating means and a water container carried adjacent said second heating means, said second heating means being adapted for heating said water to produce steam.

15. A smokeless cooker as in claim 13 including a first food support member carried in spaced, juxtaposed relation with said first heating means for supporting said food above and adjacent first heating means.

16. A smokeless cooker as in claim 14 wherein said second heating means is disposed externally of said cooking chamber.

17. A smokeless cooker as in claim 16 including steam passage means for directing steam into said cooking chamber.

18. A smokeless cooker as in claim 13 wherein said steam is provided with food flavoring for permeating said food.

* * * * *